Patented Aug. 18, 1936

2,051,435

UNITED STATES PATENT OFFICE 2,051,435

CLEANING CLOTH AND METHOD OF PRODUCING SAME

Joseph W. Colleran, Annapolis, Md., assignor of forty-five per cent to Benjamin Michaelson, Annapolis, Md.

No Drawing. Application March 25, 1933, Serial No. 662,837

4 Claims. (Cl. 87—5)

This invention relates to chemically treated carriers for washing, cleaning and polishing purposes, and to a method of producing the same.

The principal object of the invention is to provide such an article which may be used time after time for the purposes mentioned without the addition of any more of the composition of matter employed.

Another object is to provide such an article of manufacture which may be used without more preparation than the application thereto of cold or luke warm water.

Another object is to provide a novel chemically treated article for the purposes mentioned which will remove grease from the surfaces of articles.

Still another object is to provide such an article which will not disintegrate due to the chemical actions of the composition of matter associated with the carrier.

Yet another object is to provide such an article of manufacture which contains no poisonous substances.

Another object is to provide a chemically treated cloth which will not produce suds, contains no gritty substances and which when dry has practically all the appearances of ordinary cloth employed for cleaning purposes.

Still another object is to provide such an article for the purposes mentioned which will take up dirt, grease and other foreign matter, may then be washed with soap and water, and the grease and other foreign matter given up but which article will not lose its novel properties by any action of the soap on the composition of matter employed, so that the novel article of manufacture may be reemployed as before.

Another object is to provide a method of producing this novel article of manufacture.

Other objects and advantages of the invention will be apparent during the course of the following detailed description.

The composition of matter employed on the carrier includes a salt of citric acid, a sulphonated vegetable oil, water and, preferably, a hydroxide.

Preferably, this composition of matter comprises ammonium citrate $(NH_4)_3C_6H_5O_7$, sulphonated castor oil, water and, if desirable, ammonium hydroxide, and is prepared substantially as follows:—a twenty per cent solution of ammonium citrate is prepared by dissolving substantially 12½ ounces of ammonium citrate crystals in 64 ounces of water, preferably distilled water. To this solution, 25 ounces of sulphonated castor oil is added and slightly agitated, whereby a milky-amber colored liquid is produced of about the consistency of liquid castile soap. This may be treated with one ounce of ammonium hydroxide, after which the liquid assumes a light amber color and is of a consistency slightly less than that of castile soap. To every 100 ounces of this liquid, 3 to 5 gallons of preferably distilled water is added.

By volume, the preferred composition of matters, exclusive of the finally added water may be said to comprise:—

| | Parts |
|---|---|
| Ammonium citrate (20% solution) | 70 |
| Sulphonated castor oil | 29 |
| Ammonia | 1 |

This, however, may be modified if desired, so that the range, by volume, of the ingredients may be:—

| | Parts |
|---|---|
| Ammonium citrate (20% solution) | 60 to 80 |
| Sulphonated castor oil | 39 to 19 |
| Ammonia | 1 |

However, it is desirable that the ammonium citrate solution does not fall below 60 parts by volume of the composition of matter comprising the three above ingredients, for less will not produce the desirable results. This particular salt of citric acid is desirable since it is well known that citric acid will not actively attack grease and loses its activity, when in solution with water, after a time. On the other hand, ammonium citrate will attack grease and does not lose its activity when in solution with water particularly when associated with sulphonated castor oil which latter appears to further the permanency of the activity of the ammonium citrate during the life of the novel article of manufacture. Thus, the ammonium citrate is not employed solely as a means to remove stains, as is citric acid and some of its salts, but to remove grease as well, which the acid and some of its salts are unable to do.

Sulphonated castor oil is well known as a detergent, but by itself it leaves a cloudy residue, hard to remove, upon glass, for instance. In a like manner, a water solution of ammonium citrate alone leaves a rough, slightly sticky clear residue on glass, for example, which residue cannot be easily wiped off. However, a liquid containing the proportions of ammonium citrate and sulphonated castor oil as set out above, wipes easily and cleanly from glass and leaves the glass clean.

The ammonia, in the form of ammonium hydroxide, is used for two purposes:—it clarifies the liquid containing the ammonium citrate solution and sulphonated castor oil and also aids in retaining the two substances in a receptive condition during the subsequent steps in the manufacture of the novel article.

The water is employed to dilute the fluid and render the later steps of manufacture easier to carry out.

The carrier employed may be any suitable one such as a fibrous carrier. Woven cotton or woolen cloth or knitted woolen cloths are desirable and may be either of fine or open mesh.

The carriers, in a clean condition, are immersed in the fluid composition of matter heretofore set out in detail and either one of the two subsequent steps followed.

First, the carriers may be immersed in the fluid composition of matter, the latter brought to a boil and the boiling continued for substantially one hour, whereupon the carriers may be removed and dried.

If this step is not followed, the alternative step may be employed i. e., the carriers may be immersed in the substantially cold fluid composition of matter, remain for a period of substantially twelve hours therein, and may then be removed and dried.

The ammonium hydroxide used as heretofore set out, is practically driven from the fluid composition of matter during the last step and this is desirable for it appears to cause suds to form when present in the carrier containing the composition of matter and a solution of the composition of matter containing the ammonium hydroxide does not wipe off a pane of glass, for instance, nearly as readily nor as cleanly as does the composition of matter which does not contain the ammonium hydroxide.

Soft cloth carriers absorb the solution faster and consequently require substantially the minimum water set out, that is, three gallons, while heavy cloths, on the contrary, absorb the solution slowly and require substantially the maximum amount of water set out, that is, five gallons.

The dried carriers, containing the composition of matter in a substantially dry state and in and on their fibers, are then ready for the market. It appears that either of the final steps cause the carriers to become so impregnated with the composition of matter that they will retain it during substantially the life of the carrier and that the affinity of the composition of matter for the fibers of the carrier is not dependent wholly upon the sulphonated castor oil.

In use, the improved carriers are wet with cold or luke warm water and used for washing, cleaning and polishing purposes on glass, china, furniture, porcelain, chromium plated surfaces and the like, and for removing grease and dirt from pots, pans, vats, and the like. The article so washed may be subsequently dried with an ordinary drying cloth and no dangerous nor poisonous substances will remain on the article.

The composition of matter containing carriers may be cleaned by using soap and water or by rinsing in warm water, to remove the collected foreign matter therefrom. This appears to have no effect upon subsequent use of the carrier.

Various changes may be made to the invention herein shown and described and the method of manufacture without departing from the spirit of the invention or the scope of the claims, and in the claims it should be understood that the terms "by volume of ammonium citrate solution" refers to substantially the 20% solution heretofore described in detail.

What is claimed is:

1. The method of producing a cleansing article, which consists in placing a fibrous carrier in a bath, said carrier substantially insoluble therein, and said bath including substantially 70 parts by volume of a 20% aqueous solution of ammonium citrate and 29 parts by volume of sulphonated castor oil, bringing said bath to a boil, and subsequently removing said carrier.

2. The method of producing a cleansing article which consists in placing a fibrous carrier in a bath, said carrier substantially insoluble therein, and said bath including substantially 70 parts by volume of a 20% aqueous solution of ammonium citrate and 29 parts by volume of sulphonated castor oil, bringing said bath to a boil, holding said bath at a boil for substantially one hour, and subsequently removing said carrier.

3. As an article of manufacture, a fibrous absorbent carrier containing a grease-removing composition, said composition when initially applied to said carrier, consisting of from 60 to 80 parts by volume of substantially a 20% aqueous solution of ammonium citrate, from 19 to 39 parts by volume of sulphonated castor oil and the balance ammonium hydroxide.

4. As an article of manufacture, a cleansing cloth impregnated, at the time of impregnation, with substantially 70 parts by volume of a substantially 20% aqueous solution of ammonium citrate, substantially 29 parts by volume of sulphonated castor oil, and substantially 1 part by volume of ammonium hydroxide.

JOSEPH W. COLLERAN.